(12) United States Patent
Aichhorn

(10) Patent No.: US 8,601,795 B2
(45) Date of Patent: Dec. 10, 2013

(54) SENSOR FOR DETECTING THE AMOUNT OF A REDUCING AGENT AND THE AMOUNT OF A POLLUTANT IN AN EXHAUST GAS

(75) Inventor: Bernhard Aichhorn, Hellmonsoedt (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 98 days.

(21) Appl. No.: 13/294,639

(22) Filed: Nov. 11, 2011

(65) Prior Publication Data

US 2012/0055139 A1 Mar. 8, 2012

Related U.S. Application Data

(63) Continuation of application No. PCT/EP2010/055812, filed on Apr. 29, 2010.

(30) Foreign Application Priority Data

May 27, 2009 (DE) .......................... 10 2009 022 882

(51) Int. Cl.
  *F01N 3/00* (2006.01)
  *F01N 3/10* (2006.01)
  *F01N 3/02* (2006.01)

(52) U.S. Cl.
  USPC ................... 60/286; 60/276; 60/295; 60/301; 60/311

(58) Field of Classification Search
  USPC ............ 60/276, 286, 295, 299, 301, 303, 311
  See application file for complete search history.

(56) References Cited

U.S. PATENT DOCUMENTS

| 6,625,975 | B1 | 9/2003 | Stahl et al. |
| 7,546,728 | B2 | 6/2009 | Ripper et al. |
| 2004/0098979 | A1* | 5/2004 | Hammerle et al. ............. 60/295 |
| 2004/0154285 | A1 | 8/2004 | Nagaoka et al. |
| 2006/0130458 | A1 | 6/2006 | Solbrig |

(Continued)

FOREIGN PATENT DOCUMENTS

| CN | 1521390 A | 8/2004 |
| CN | 101316994 A | 12/2008 |

(Continued)

OTHER PUBLICATIONS

German Search Report dated Sep. 28, 2009 including partial English-language translation (Nine (9) pages).

(Continued)

*Primary Examiner* — Kenneth Bomberg
*Assistant Examiner* — Audrey K Bradley
(74) *Attorney, Agent, or Firm* — Crowell & Moring LLP

(57) ABSTRACT

A system assembly detects the amount of reducing agent and the amount of pollutant in an exhaust gas. The system assembly has a first pollutant sensor, which is cross-sensitive to the reducing agent, and is provided for emitting a first measuring signal proportional to the amount of pollutant in the exhaust gas for use in front of a filtering device for the selective reducing of the reducing agent or the pollutant in the exhaust gas. A second pollutant sensor, which is also cross-sensitive to the reducing agent, emits a second measuring signal proportional to the amount of pollutant in the exhaust gas for use behind the filtering device.

13 Claims, 1 Drawing Sheet

(56) References Cited

U.S. PATENT DOCUMENTS

| | | |
|---|---|---|
| 2007/0137181 A1 | 6/2007 | Upadhyay et al. |
| 2008/0282680 A1 | 11/2008 | Tachy et al. |
| 2009/0120073 A1 | 5/2009 | Fujita et al. |
| 2010/0058746 A1 | 3/2010 | Pfeifer et al. |

FOREIGN PATENT DOCUMENTS

| | | |
|---|---|---|
| DE | 43 16 970 C1 | 8/1994 |
| DE | 199 19 472 A1 | 11/2000 |
| DE | 10 2007 009 873 A1 | 9/2008 |
| DE | 10 2008 043 355 A1 | 5/2009 |
| EP | 1 961 933 A1 | 8/2008 |
| FR | 2 872 544 A1 | 1/2006 |
| WO | WO 2007/145548 A1 | 12/2007 |
| WO | WO 2010068147 A1 * | 6/2010 |

OTHER PUBLICATIONS

International Search Report dated Jul. 9, 2010 including English-language translation (Four (4) pages).

Chinese-language Office Action dated Apr. 11, 2013 with English translation (Sixteen (16) pages).

* cited by examiner

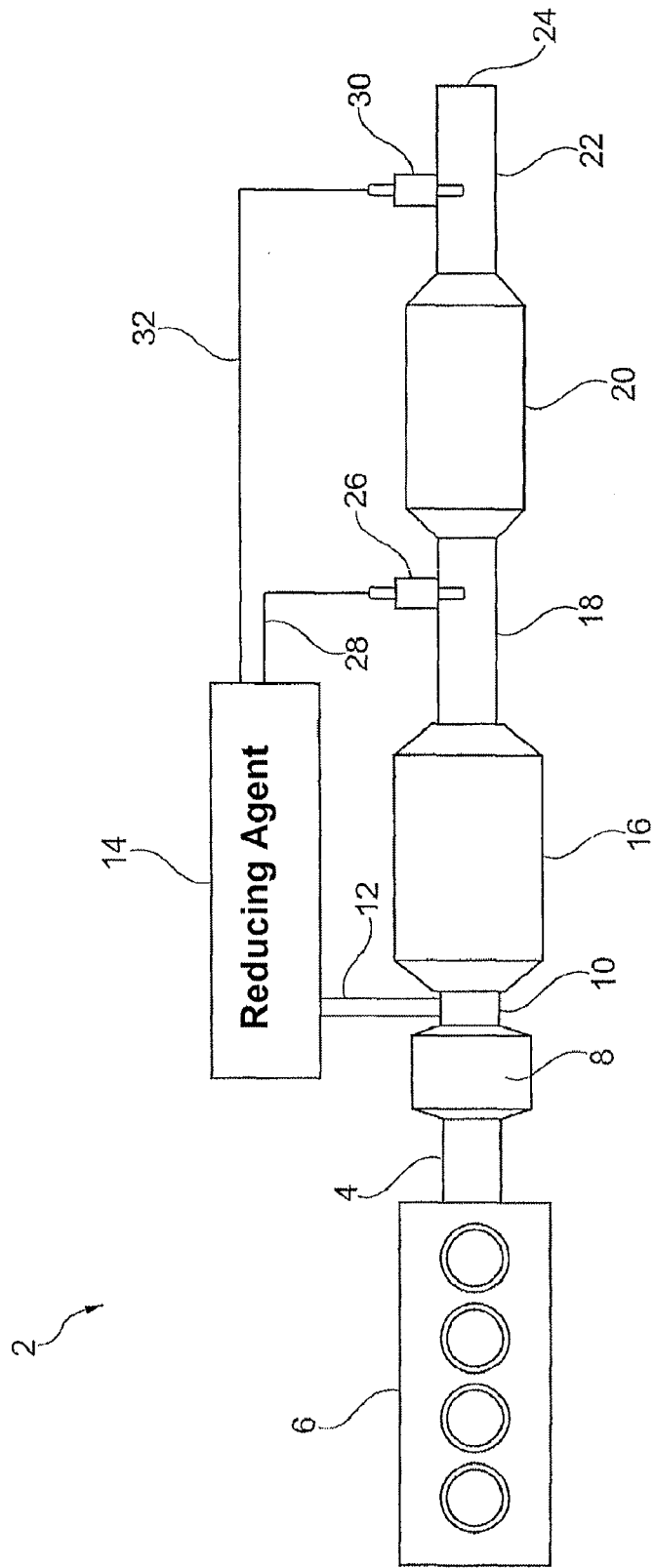

SENSOR FOR DETECTING THE AMOUNT OF A REDUCING AGENT AND THE AMOUNT OF A POLLUTANT IN AN EXHAUST GAS

CROSS-REFERENCE TO RELATED APPLICATIONS

This application is a continuation of PCT International Application No. PCT/EP2010/055812, filed Apr. 29, 2010, which claims priority under 35 U.S.C. §119 from German Patent Application No. DE 10 2009 022 882.9, filed May 27, 2009, the entire disclosures of which are herein expressly incorporated by reference.

BACKGROUND AND SUMMARY OF THE INVENTION

The invention relates to a system assembly for detecting the amount of a reducing agent, such as ammonia, and the amount of a pollutant, such as nitrogen oxide, in an exhaust gas, to an arrangement for the selective catalytic reduction of pollutants in an exhaust gas, to an exhaust gas aftertreatment system and to a process for detecting the amount of reducing agent and the amount of pollutant in an exhaust gas.

Exhaust gases resulting from the fuel combustion in a vehicle have to be aftertreated for minimizing the pollutant emission. For example, the emission of nitrogen oxides is to be avoided because they not only lead to irritation and damage of the human respiratory organs but are also held responsible for acid rain and for smog.

Pollutants of this type can be removed from the exhaust gas in a targeted manner by selective catalytic reduction. For this purpose, a reducing agent, such as ammonia, is introduced into the exhaust gas, the amount of dosed reducing agent corresponding to the estimated amount of pollutants in the exhaust gas. The exhaust gas that is enriched with the reducing agent will then pass through a catalyst in which the pollutants react with the reducing agent and are converted to neutral substances, such as water and nitrogen. However, if the reducing agent dose is too low, pollutants will remain in the exhaust gas after the reaction. If it is too high, reducing agent will remain in the exhaust gas, which is also undesirable because ammonia, for example, is also harmful to health and the environment.

A pollutant sensor, such as a nitrogen oxide sensor, can supply an output signal for estimating the pollutants situated in the exhaust gas emerging from the catalyst. On the basis of this output signal, the required reducing agent dose can be better adjusted. However, the pollutant sensor is cross-sensitive to the reducing agent, so that the information concerning the pollutant amount and the information concerning the reducing agent amount are mutually mixed in the output signal. The pollutant amount and the reducing agent amount can therefore not be determined from the output signal in a mutually separate manner.

Since the amount of pollutant in the exhaust gas cannot be determined directly, the control of the selective catalytic reduction is conventionally intrusive. In this case, a system imbalance is forced, and the reducing agent dose is adjusted based on the reactions measured by the pollutant sensor. However, the intrusive control process will lead to an operation of the entire system that is not optimal, which results in an unnecessary emission of pollutants and/or reducing agents with the exhaust gas. High-expenditure computation algorithms are required for processing the output signal from the pollutant sensor.

It is therefore an object of the invention to provide a system assembly for detecting the amount of reducing agent and the amount of pollutant in an exhaust gas, which technically can be more easily implemented and nevertheless furnishes improved measuring results.

This and other objects are achieved by a system assembly for detecting the amount of reducing agent and the amount of pollutant in an exhaust gas, having a first pollutant sensor, which is cross-sensitive to the reducing agent, for emitting a first measuring signal proportional to the amount of pollutant in the exhaust gas for use in front of a filtering device for the selective reducing of the reducing agent or the pollutant in the exhaust gas, and a second pollutant sensor, which is cross-sensitive to the reducing agent, for emitting a second measuring signal proportional to the amount of pollutant in the exhaust gas for use behind the filtering device The invention is based on selectively filtering, after a first measuring of the pollutant amount, either only pollutant or only reducing agent from the exhaust gas, and then carrying out the measurement again post-filtering. Assuming that the unfiltered constituent in the exhaust gas has remained constant, two independent measuring values are present for computing the reducing-agent fraction and the pollutant fraction in the exhaust gas. The computation itself is linear and therefore can technically be implemented very easily.

According to the invention, a system assembly for detecting the amount of reducing agent and the amount of pollutant in an exhaust gas therefore has a first pollutant sensor which is cross-sensitive to the reducing agent, is provided for emitting a first measuring signal proportional to the amount of pollutant in the exhaust gas, and is suitable for a use in front of a filtering device for reducing the reducing agent or the pollutant in the exhaust gas. Furthermore, the system assembly has a second pollutant sensor, which is cross-sensitive to the reducing agent, for emitting a second measuring signal proportional to the amount of pollutant in the exhaust gas and which is provided for use behind the filtering device. By processing the two measuring signals, the reducing agent fraction and the pollutant fraction in the exhaust gas can be measured separately from one another. As a result of the linear processing of the signals, the system assembly permits a particularly simple control while the overall system has a short reaction time to changes.

The system assembly may contain a computation device for determining the amount of pollutant and the amount of reducing agent based on the difference of the measuring signals from the first and second pollutant sensor.

The pollutant may be nitrogen oxide; the reducing agent may be ammonia; and the exhaust gas may be a lean exhaust gas.

The system assembly may have a filtering device which is provided for filtering the pollutant or the reducing agent.

In a vehicle having an installed Diesel particulate filter provided for oxidizing the reducing agent, this diesel particulate filter can be used directly as a filtering device for filtering the reducing agent, whereby the system assembly according to this aspect of the invention can be implemented in a particularly simple and cost-effective manner in a conventional vehicle.

According to one aspect of the invention, it is particularly advantageous to completely remove one of the constituents from the exhaust gas after the first measurement, so that, during the second measurement, the unfiltered constituent can be inferred directly from the measuring signal after the filtering, and only a single computation will be required for determining the filtered constituent.

The invention also provides an arrangement for the selective catalytic reduction of pollutants in an exhaust gas, having a system assembly according to the invention for detecting the amount of pollutant and the amount of reducing agent in the exhaust gas at the output of the arrangement. The arrangement has an injection mechanism which is provided for injecting the reducing agent into the exhaust gas at the input of the arrangement based on a dosing amount as a function of the measuring signals of the sensor. The arrangement further has a catalyst which is provided for reducing the pollutants in the exhaust gas based on the reducing agent. Since the system assembly according to the invention separately outputs the amount of pollutant and of reducing agents in the exhaust gas, the pollutant fraction in the exhaust gas cannot only be adjusted directly, the control can also take place in the state of equilibrium of the overall system. Thus, an optimal dosing of the reducing agent is possible for a maximal reduction of the pollutants without having to provide intrusive control.

The measured reducing agent fraction in the exhaust gas and, therefore, the computed optimal dosing of the reducing agent, allows conclusions concerning the condition of all technical components cooperating with respect to the exhaust gas flow. By means of a standardized optimal dosing, which can be predefined, for example, by the manufacturer, it can be determined in a particularly simple manner that the overall system is functioning properly when the computed optimal dosing corresponds to the predefined standard. Deviations from this standard can therefore be used as a basis for recognizing or even correcting hardware malfunctions.

Furthermore, the measured reducing agent fraction in the exhaust gas also permits an improved on-board diagnosis of the exhaust gas purification in a coasting operation of the vehicle. Although, as experience shows, the reducing agent cannot be completely removed from the exhaust gas in every case by the controlled system in the coasting operation, this is not harmful to a corresponding zero point adjustment during the control, because the system assembly according to the invention is capable of indicating the reducing agent fraction in the exhaust gas as an absolute value.

Finally, the measured reducing agent and pollutant fraction in the exhaust gas also makes it possible to more precisely determine the control efficiency, whereby the overall system can be operated more efficiently.

The injection mechanism can be provided for increasing the dosing amount for the reducing agent when a rise in the amount of pollutant is measured, and for lowering the dosing amount for the reducing agent when a rise in the amount of reducing agent is measured.

The control loop may also have a processing apparatus for the mathematical processing of the dosing amount. For adjusting the dosing amount, the processing apparatus may be provided such that the amount of reducing agent and the amount of pollutant in the exhaust gas are minimized at the output of the arrangement.

As an alternative or in addition, the processing apparatus may be provided for averaging the dosing amount over time. The standardized optimal dosing amount during the operation can thereby be adapted to aging phenomena of the hardware in the overall system.

The processing apparatus may also be provided for the independent processing of the dosing amount for different operating ranges of the arrangement.

The invention also provides an exhaust gas aftertreatment system with the arrangement according to the invention. The system has a catalyst, particularly a diesel oxidation catalyst for oxidizing pollutants in the exhaust gas from an engine, particularly a diesel engine, which is provided for the combustion of a fuel mixture, particularly a lean fuel mixture. The arrangement according to the invention is provided in this system for minimizing nitrogen oxides in the exhaust gas from the catalyst. In particular, exhaust gases resulting from the combustion of a lean fuel mixture can be freed of nitrogen oxides in a particularly effective manner.

The invention also provides a process for detecting the amount of reducing agent and the amount of pollutant in an exhaust gas. The process is composed of the steps of emitting a first measuring signal proportional to the amount of reducing agent and to the amount of pollutant in the exhaust gas, filtering the exhaust gas by reducing the reducing agent or the pollutant in the exhaust gas, and emitting a second measuring signal proportional to the amount of reducing agent and to the amount of pollutant in the filtered exhaust gas.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a schematic diagram illustrating an embodiment of an exhaust gas aftertreatment system according to the invention

DETAILED DESCRIPTION OF THE DRAWING

In FIG. 1, an embodiment of an exhaust gas aftertreatment system 2 is shown. The aftertreatment system 2 is suitable for minimizing the nitrogen oxide fraction in the engine exhaust gas 4 from an engine 6. The engine exhaust gas 4 is fed to a diesel oxidation catalyst 8, in which hydrocarbon compounds and carbon monoxide from the engine exhaust gas are afterburnt. The prepurified engine exhaust gas 10 from the diesel oxidation catalyst 8 is enriched with ammonia 12 from a dosing apparatus 14 to be described below, and is subjected to a selective catalytic reduction 16. In this case, nitrogen oxides in the prepurified engine gas 10 and the ammonia react with one another and convert to nitrogen and water. A diesel particulate filter 20 filters the remaining ammonia 12 from the thus purified engine exhaust gas 18 and emits the filtered exhaust gas 22 to the atmosphere (ambient air) 24.

According to one embodiment of the invention, a first nitrogen oxide sensor 26 measures the nitrogen oxide fraction in the purified engine exhaust gas 18 and supplies the measuring result in the form of a first measuring signal 28 to the dosing apparatus 14. A second nitrogen oxide sensor 30 measures the nitrogen oxide fraction in the filtered engine exhaust gas 22 and supplies the measuring result in the form of a second measuring signal 32 to the dosing apparatus 14. For technical reasons, the two nitrogen oxide sensors 26, 30 are cross-sensitive to the ammonia 12 in the engine exhaust gases 18, 22, so that the measuring signals 28, 32 are a function of the nitrogen oxide fraction and of the ammonia fraction in the engine exhaust gases 18, 22.

Because, in the present embodiment, the diesel particulate filter 20 filters the remaining ammonia 12 completely out of the purified engine exhaust gas 18 and leaves the nitrogen oxide fraction unchanged, the second measuring signal 32 indicates the nitrogen oxide fraction not only in the filtered engine exhaust gas 22 but also in the purified engine exhaust gas 18. From the difference between the second measuring signal 32 and the first measuring signal 28, the dosing apparatus 14 can therefore determine the fraction of ammonia 12 in the purified engine exhaust gas 18 and can appropriately dose the ammonia 12 for the prepurified engine exhaust gas 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for detecting at least one of an amount of reducing agent and an amount of pollutant in an exhaust gas, the process comprising the acts of:
    emitting a first measuring signal proportional to the amount of the reducing agent and to the amount of the pollutant in the exhaust gas;
    filtering the exhaust gas by reducing one of the reducing agent and the pollutant in the exhaust gas;
    emitting a second measuring signal proportional to the amount of the reducing agent and to the amount of pollutant in the filtered exhaust gas;
    determining at least one of the amount of the reducing agent and the amount of the pollutant in the exhaust gas based on a difference between the first and second measuring signals; and
    increasing a dosing amount of the reducing agent when the determined amount of pollutant increases and lowering the dosing amount of the reducing agent when the determined amount of reducing agent increases.

2. A system for use in detecting an amount of reducing agent and an amount of pollutant in an exhaust gas, the system comprising:
    a filtering device for a selective reduction of one of the reducing agent and the pollutant in the exhaust gas;
    a first pollutant sensor arranged upstream of the filtering device, the first pollutant sensor being cross-sensitive to the reducing agent and emitting a first measuring signal proportional to the amount of the pollutant in the exhaust gas;
    a second pollutant sensor arranged downstream of the filtering device, the second pollutant sensor being cross-sensitive to the reducing agent and emitting a second measuring signal proportional to the amount of pollutant in the exhaust gas, and
    a dosing apparatus receiving the first and second measuring signals, the dosing apparatus being operatively configured for determining at least one of the amount of pollutant and the amount of reducing agent based on a difference between the first and second measuring signals from the first and second pollutant sensors, respectively,
    wherein the dosing apparatus is operatively configured to increase the dosing amount of the reducing agent when a rise in the amount of pollutant is measured, and to lower the dosing amount of the reducing agent when a rise in the amount of reducing agent is measured.

3. The system according to claim 1, wherein the pollutant is nitrogen oxide, the reducing agent is ammonia, and the exhaust gas is a lean exhaust gas.

4. The system according to claim 1, wherein the filtering device is operatively configured to completely remove the reducing agent from the exhaust gas.

5. The system according to claim 1, wherein the filtering device is a diesel particulate filter operatively configured for oxidizing the reducing agent.

6. The system according to claim 5, wherein the filtering device is operatively configured to completely remove the reducing agent from the exhaust gas.

7. An arrangement for selective catalytic reduction of pollutants in an exhaust gas, the arrangement comprising:
    a system for use in detecting an amount of reducing agent and an amount of pollutant in the exhaust gas, the system comprising a first pollutant sensor arranged upstream of a filtering device and a second pollutant sensor arranged downstream of the filtering device, the first and second pollutant sensors being cross-sensitive to the reducing agent and emitting, respectively, first and second measuring signals proportional to the amount of pollutant in the exhaust gas;
    a selective reduction catalyst arranged upstream of the first pollutant sensor, the catalyst reducing pollutants in the exhaust gas based on the reducing agent; and
    an injection mechanism for injecting the reducing agent into the exhaust gas at an input of the selective reduction catalyst based on a dosing amount determined as a function of a difference between the first and second measuring signals of the pollutant sensors,
    wherein the injection mechanism is operatively configured to increase the dosing amount of the reducing agent when a rise in the amount of pollutant is measured, and to lower the dosing amount of the reducing agent when a rise in the amount of reducing agent is measured.

8. The arrangement according to claim 7, for use in exhaust gas aftertreatment, further comprising:
    a diesel oxidation catalyst for oxidizing pollutants in the exhaust gas from a diesel engine that combusts a lean fuel mixture whereby nitrogen oxides in the exhaust gas from the catalyst are minimized,
    wherein the diesel oxidation catalyst is arranged upstream of the selective reduction catalyst.

9. The arrangement according to claim 7, further comprising a dosing apparatus for computing the dosing amount.

10. The arrangement according to claim 9, wherein the dosing apparatus independently processes the dosing amount for different operating ranges of the arrangement.

11. The arrangement according to claim 9, for use in exhaust gas aftertreatment, further comprising:
    a diesel oxidation catalyst for oxidizing pollutants in the exhaust gas from a diesel engine that combusts a lean fuel mixture whereby nitrogen oxides in the exhaust gas from the catalyst are minimized,
    wherein the diesel oxidation catalyst is arranged upstream of the selective reduction catalyst.

12. The arrangement according to claim 9, wherein the dosing apparatus is operatively configured to adjust the dosing amount in order to minimize the amount of reducing agent and the amount of pollutant in the exhaust gas at an output of the arrangement.

13. The arrangement according to claim 12, wherein the dosing apparatus is operatively configured to average the dosing amount over time.

* * * * *